(12) United States Patent
Kawakami et al.

(10) Patent No.: US 7,755,320 B2
(45) Date of Patent: Jul. 13, 2010

(54) INTEGRATED CIRCUIT FOR DRIVING MOTOR

(75) Inventors: Hiroaki Kawakami, Gunma-ken (JP); Takashi Someya, Hanyu (JP); Tetsuya Yoshitomi, Gunma-ken (JP)

(73) Assignees: Sanyo Electric Co., Ltd., Osaka (JP); Sanyo Semiconductor Co., Ltd., Ora-gun, Gunma (JP)

( * ) Notice: Subject to any disclaimer, the term of this patent is extended or adjusted under 35 U.S.C. 154(b) by 366 days.

(21) Appl. No.: 12/023,948

(22) Filed: Jan. 31, 2008

(65) Prior Publication Data

US 2008/0185987 A1 Aug. 7, 2008

(30) Foreign Application Priority Data

Feb. 1, 2007 (JP) .............................. 2007-023145

(51) Int. Cl.
*H02P 27/08* (2006.01)
(52) U.S. Cl. .................................. 318/811; 318/400.17
(58) Field of Classification Search ................. 318/599, 318/811, 400.01, 400.06, 400.09, 400.13, 318/400.17, 400.2, 400.27, 400.28, 400.29, 318/400.3
See application file for complete search history.

(56) References Cited

U.S. PATENT DOCUMENTS

| 4,884,094 | A | * | 11/1989 | Kitaura et al. | ................. | 396/57 |
| 5,013,982 | A | * | 5/1991 | Sasaki | ......................... | 318/114 |
| 5,144,209 | A | * | 9/1992 | Inaji et al. | .............. | 318/400.04 |
| 5,949,202 | A | * | 9/1999 | Vlahu | ...................... | 318/254.1 |
| 6,130,989 | A | * | 10/2000 | Mizumoto et al. | .......... | 388/815 |
| 6,157,151 | A | * | 12/2000 | Yoshitomi et al. | ........ | 318/400.2 |
| 2009/0021199 | A1 | * | 1/2009 | Maeto et al. | ........... | 318/400.09 |
| 2009/0115535 | A1 | * | 5/2009 | Takeuchi | ..................... | 331/25 |
| 2009/0303271 | A1 | * | 12/2009 | Tabata et al. | .................. | 347/10 |
| 2009/0315820 | A1 | * | 12/2009 | Arisawa et al. | ............... | 345/98 |

FOREIGN PATENT DOCUMENTS

| JP | 2004-104940 | 4/2004 |
| JP | 2005-287186 | 10/2005 |

* cited by examiner

*Primary Examiner*—Walter Benson
*Assistant Examiner*—Eduardo Colon
(74) *Attorney, Agent, or Firm*—SoCal IP Law Group LLP; Steven C. Sereboff; John E. Gunther (57) ABSTRACT

A motor driving integrated circuit includes a data receiving circuit, a control circuit, and a pulse generating circuit. The data signal receiving circuit receives data signals inputted via a data signal input terminal. The control circuit controls the motor driving integrated circuit based on a first data signal received through the data signal receiving circuit. The pulse generating circuit generates a pulse signal for PWM (Pulse Width Modulation)—controlling a motor coil based on a second data signal received through the data signal receiving circuit. The pulse generating circuit includes a rectangular signal generating circuit configured to generate a plurality of rectangular signals different in pulse width, and a synthesizing circuit configured to synthesize the plurality of rectangular signals outputted from the rectangular signal generating circuit to generate the pulse signal with a duty ratio corresponding to the second data signal.

6 Claims, 10 Drawing Sheets

| INPUT | | | | | | SET MODE | SET CONTENT |
|---|---|---|---|---|---|---|---|
| D0 | D1 | D2 | D3 | D4 | D5 | | |
| 0 | 0 | 0 | 0 | 0 | 0 | ZM DUTY | 50% |
| | | | 0 | 0 | 1 | | 56.25% |
| | | | 0 | 1 | 0 | | 62.5% |
| | | | 0 | 1 | 1 | | 68.75% |
| | | | 1 | 0 | 0 | | 75% |
| | | | 1 | 0 | 1 | | 81.25% |
| | | | 1 | 1 | 0 | | 87.5% |
| | | | 1 | 1 | 1 | | 93.75% |
| 0 | 0 | 1 | 0 | * | * | ZM ROTATIONAL DIRECTION | FORWARD DIRECTION |
| | | | 1 | * | * | | REVERSE DIRECTION |

FIG. 3

| INPUT | | | | | | SET MODE | SET CONTENT |
|---|---|---|---|---|---|---|---|
| D0 | D1 | D2 | D3 | D4 | D5 | | |
| 0 | 1 | 0 | 0 | 0 | 0 | AF DUTY | 50% |
| | | | 0 | 0 | 1 | | 56.25% |
| | | | 0 | 1 | 0 | | 62.5% |
| | | | 0 | 1 | 1 | | 68.75% |
| | | | 1 | 0 | 0 | | 75% |
| | | | 1 | 0 | 1 | | 81.25% |
| | | | 1 | 1 | 0 | | 87.5% |
| | | | 1 | 1 | 1 | | 93.75% |
| 0 | 1 | 1 | 0 | * | * | AF ROTATIONAL DIRECTION | FORWARD DIRECTION |
| | | | 1 | * | * | | REVERSE DIRECTION |
| | | | * | 0 | * | AF EXCITATION MODE | TWO-PHASE EXCITATION |
| | | | * | 1 | * | | ONE-TWO PHASE EXCITATION |

FIG. 4

| INPUT | | | | | | SET MODE | SET CONTENT |
|---|---|---|---|---|---|---|---|
| D0 | D1 | D2 | D3 | D4 | D5 | | |
| 1 | 0 | 0 | 0 | 0 | 0 | 4ch ENERGIZING DIRECTION | OFF |
| | | | 0 | 0 | 1 | | OUT7→OUT8 |
| | | | 0 | 1 | 0 | | OUT8→OUT7 |
| | | | 0 | 1 | 1 | | BRAKE |
| | | | 1 | 0 | 0 | 5ch ENERGIZING DIRECTION | OFF |
| | | | 1 | 0 | 1 | | OUT8→OUT9 |
| | | | 1 | 1 | 0 | | OUT9→OUT8 |
| | | | 1 | 1 | 1 | | BRAKE |
| 1 | 0 | 1 | 0 | 0 | 0 | CONSTANT CURRENT REFERENCE VOLTAGE | 0.1500V |
| | | | 0 | 0 | 1 | | 0.1450V |
| | | | 0 | 1 | 0 | | 0.1400V |
| | | | 0 | 1 | 1 | | 0.1350V |
| | | | 1 | 0 | 0 | | 0.1300V |
| | | | 1 | 0 | 1 | | 0.1250V |
| | | | 1 | 1 | 0 | | 0.1200V |
| | | | 1 | 1 | 1 | | 0.1150V |

| INPUT | | | | | | SET MODE | SET CONTENT |
|---|---|---|---|---|---|---|---|
| D0 | D1 | D2 | D3 | D4 | D5 | | |
| 0 | 0 | 1 | 0 | 0 | 0 | ZM DUTY | 56.25% |
| | | | 0 | 0 | 1 | | 62.5% |
| | | | 0 | 1 | 0 | | 68.75% |
| | | | 0 | 1 | 1 | | 75% |
| | | | 1 | 0 | 0 | | 81.25% |
| | | | 1 | 0 | 1 | | 87.5% |
| | | | 1 | 1 | 0 | | 93.75% |
| | | | 1 | 1 | 1 | | 100% |
| 0 | 1 | 1 | 0 | 0 | 0 | AF DUTY | 56.25% |
| | | | 0 | 0 | 1 | | 62.5% |
| | | | 0 | 1 | 0 | | 68.75% |
| | | | 0 | 1 | 1 | | 75% |
| | | | 1 | 0 | 0 | | 81.25% |
| | | | 1 | 0 | 1 | | 87.5% |
| | | | 1 | 1 | 0 | | 93.75% |
| | | | 1 | 1 | 1 | | 100% |

INTEGRATED CIRCUIT FOR DRIVING MOTOR

CROSS-REFERENCE TO RELATED APPLICATION

This application claims the benefit of priority to Japanese Patent Application No. 2007-23145, filed Feb. 1, 2007, of which full contents are incorporated herein by reference.

BACKGROUND OF THE INVENTION

1. Field of the Invention

The present invention relates to a motor driving integrated circuit.

2. Description of the Related Art

A modern electronic device often has a plurality of motors in one device. For example, a digital camera has a plurality of motors in order to drive a zoom mechanism, a focus mechanism, an aperture mechanism, a shutter unit, and the like. Therefore, a plurality of motors have been generally driven by the use of one motor driving integrated circuit (for example, see Japanese Patent Laid-Open Publication No. 2004-104940).

The driving voltages of motors controlled by the use of such a motor driving integrated circuit are often not identical among all the motors but different per motor. In this manner, in a motor driving integrated circuit for driving a plurality of motors which driving voltages are different from each other, it has been often seen that a plurality of driving voltages different per each of the motors are not applied to the motor driving integrated circuit but only the highest driving voltage of all the driving voltages is applied. A motor that dose not necessitate a high driving voltage applied from an external power source has generally been used with driving voltage lowered by constant voltage control, PWM (Pulse Width Modulation) control, or the like in a motor driving integrated circuit (for example, see Japanese Patent Laid-Open Publication No. 2005-287186).

Figure 11:
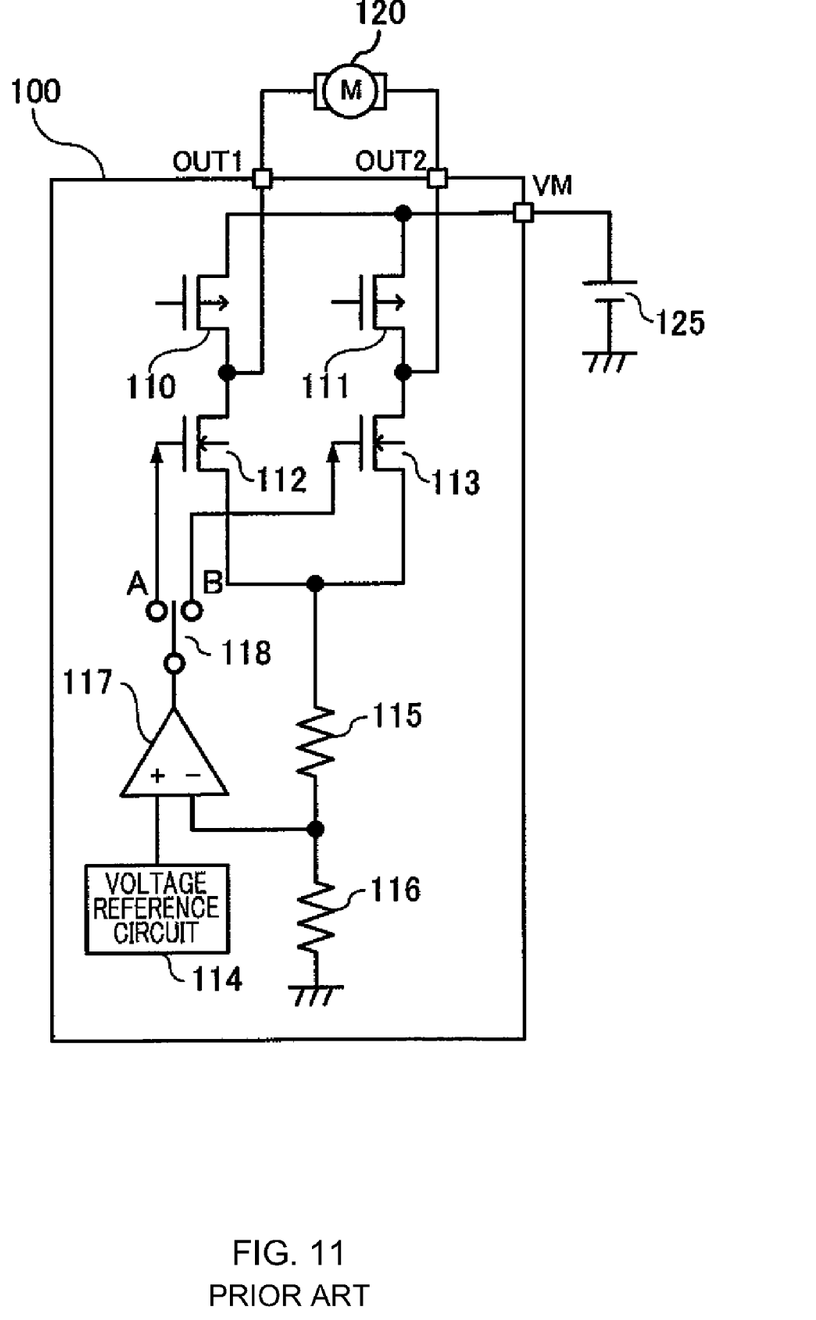
FIG. 11 is a diagram showing a general structural example of a motor driving integrated circuit that lowers motor driving voltage by constant voltage control.

FIG. 11 is a diagram showing a general structural example of a motor driving integrated circuit that can lower motor driving voltage by constant voltage control. A motor driving integrated circuit 100 is composed of p-channel MOSFETs 110 and 111, n-channel MOSFETs 112 and 113, a voltage reference circuit 114, resistors 115 and 116, a comparator 117, and a switching circuit 118. The circuit 100 controls the drive of a plurality of motors including a motor 120. The motor 120 is for example a DC motor that controls the zoom mechanism of a digital camera, and is connected between terminals OUT1 and OUT2 of the motor driving integrated circuit 100. A power supply voltage $V_M$ outputted from a power source 125 is applied to the motor driving integrated circuit 100 through a terminal VM. This power supply voltage $V_M$ is, for example, the highest voltage in the driving voltages of the plurality of motors that are driven by the motor driving integrated circuit 100, and is higher than the driving voltage of the motor 120.

The p-channel MOSFETs 110 and 111, and n-channel MOSFETs 112 and 113 configure an H bridge circuit. When the p-channel MOSFET 110 and n-channel MOSFET 113 are on, and the p-channel MOSFET 111 and n-channel MOSFET 112 are off, the motor 120 is energized in the direction from the terminal OUT1 to the terminal OUT2. Also, when the p-channel MOSFET 111 and n-channel MOSFET 112 are on, and the p-channel MOSFET 110 and n-channel MOSFET 113 are off, the motor 120 is energized in the direction from the terminal OUT2 to the terminal OUT1.

For example, when the motor 120 is to be energized in the direction from the terminal OUT1 to the terminal OUT2, the p-channel MOSFET 110 and n-channel MOSFET 113 are to turn on. Here, by turning the p-channel MOSFET 110 on, a voltage $V_{OUT1}$ of the terminal OUT1 becomes substantially equal to the voltage $V_M$ applied at the terminal VM. Therefore, $V_{OUT1}$ can be expressed as: $V_{OUT1}=V_M$. On the other hand, the voltage $V_{OUT2}$ at the terminal OUT2 is controlled by the comparator 117 in such a way that the driving voltage ($V_{OUT1}-V_{OUT2}$) of the motor 120 becomes a predetermined voltage $V_M'$ lower than the voltage $V_M$. That is, when the motor 120 is energized in the direction from the terminal OUT1 to the terminal OUT2, the switching circuit 118 is switched to the terminal B, and then a gate voltage of the n-channel MOSFET 113 is controlled in such a way that the voltage at the junction of the resistors 115 and 116 becomes equal to a voltage outputted from the voltage reference circuit 114. Therefore, the voltage $V_{OUT2}=V_{OUT2}-V_M'$.

As mentioned above, although the driving voltage of the motor 120 may become the voltage $V_M'$ lower than the voltage $V_M$ by constant voltage control, a wasteful electric power is consumed in the motor driving integrated circuit because the voltage $V_{OUT2}$ becomes a voltage obtained by lowering the voltage $V_M$. That is, when the current that runs the motor 120 during constant voltage control is represented as I, in addition to a motor driving power of $V_M'\times I$, an electric power of $(V_M-V_M'=V_{OUT2})\times I$ also is consumed, and therefore power consumption increases.

Also, although it is possible to control power consumption of a motor driving integrated circuit by using PWM control instead of constant voltage control, it is necessary to input a pulse signal for PWM control, adjusted to have a predetermined duty ratio, from an external pulse generator to the motor driving integrated circuit. As a result, the number of the terminals of the motor driving integrated circuit increases, which also results in cost increase.

The present invention has been made in view of the problems above. The principal objectives of the present invention are to provide a motor driving integrated circuit that is able to restrain increase of power consumption and the number of terminals.

SUMMARY OF THE INVENTION

A motor driving integrated circuit for controlling motor driving according to an aspect of the present invention, comprises: a data signal input terminal; a data signal receiving circuit configured to receive a data signal inputted from the data signal input terminal; a control circuit configured to control the motor driving integrated circuit based on a first data received through the data signal receiving circuit; and a pulse generating circuit configured to generate a pulse signal for PWM (Pulse Width Modulation)—controlling a motor coil based on a second data signal received through the data signal receiving circuit, the pulse generating circuit including: a rectangular signal generating circuit configured to generate a plurality of rectangular signals different in pulse width; and a synthesizing circuit configured to synthesize the plurality of rectangular signals outputted from the rectangular signal. generating circuit to generate the pulse signal with a duty ratio corresponding to the second data signal.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
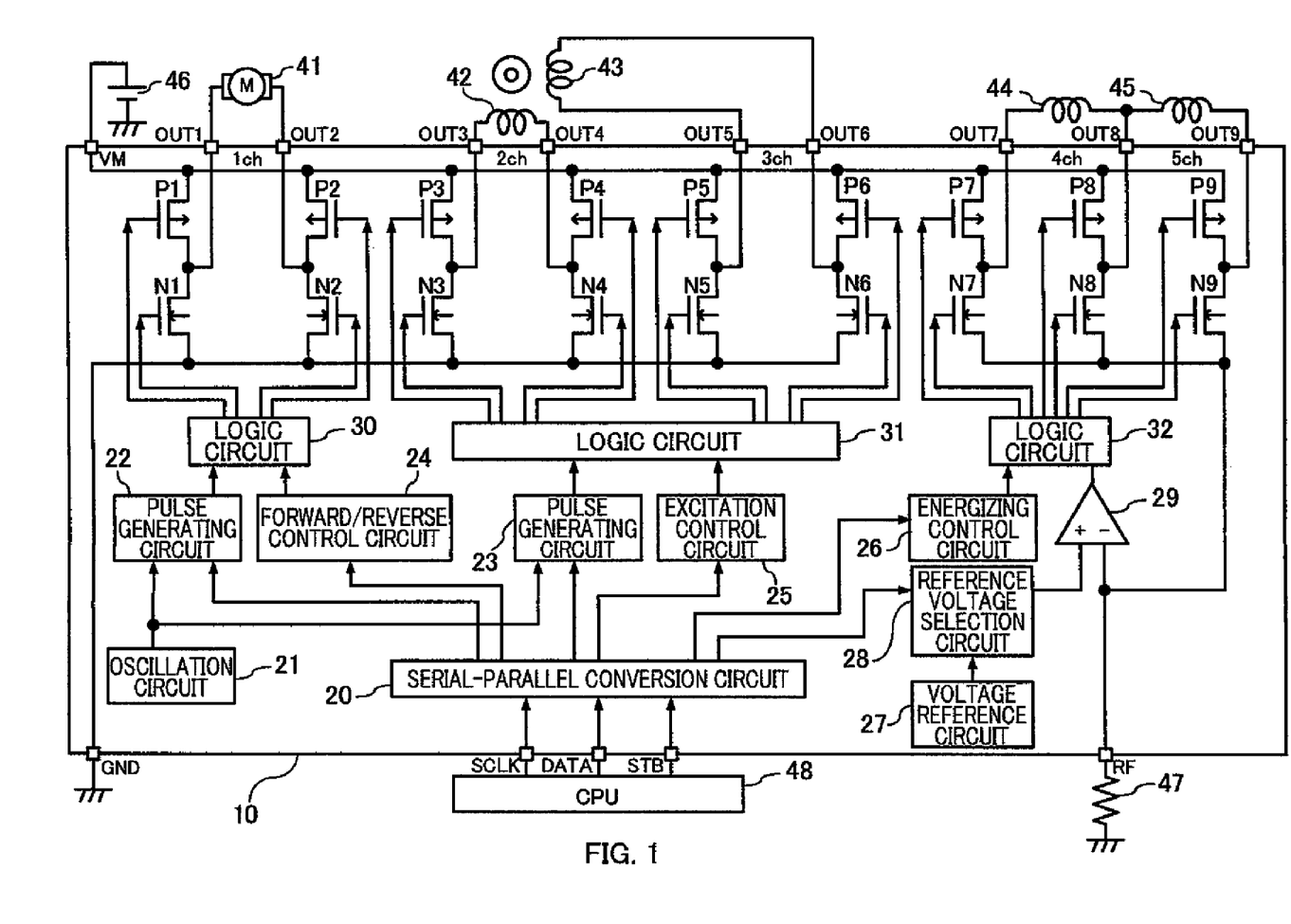
FIG. 1 is a diagram showing a structure of a motor driving integrated circuit that is one embodiment of the present invention.

FIG. 1 is a diagram showing a structure of a motor driving integrated circuit that is one embodiment of the present invention. A motor driving integrated circuit 10 is comprised of MOSFETs P1 to P9, n-channel MOSFETs N1 to N9, a serial-parallel conversion circuit 20, an oscillation circuit 21, pulse generating circuits 22 and 23, a forward/reverse control circuit 24, an excitation control circuit 25, an energizing control circuit 26, a voltage reference circuit 27, a reference voltage selection circuit 28, a comparator 29, and logic circuits 30 to 32. In addition, the motor driving integrated circuit 10 is provided with terminals VM, OUT1 to OUT9, GND, SCLK, DATA, STB, and RF as externally connecting terminals.

The p-channel MOSFETs P1 to P9 and the n-channel MOSFETs N1 to N9 are transistors for controlling energizing of a plurality of motor coils 41 to 45.

The p-channel MOSFETs P1 and P2 and the n-channel MOSFETs N1 and N2 configure an H bridge circuit. The connecting point of the p-channel MOSFET P1 and the n-channel MOSFET N1 is connected to the terminal OUT1, and the connecting point of the p-channel MOSFET P2 and the n-channel MOSFET N2 is connected to the terminal OUT2. The motor coil 41 is connected between the terminals OUT1 and OUT2 (1 channel: 1 ch). The motor coil 41 is for example a coil of a DC motor that controls a zoom mechanism (ZM) of a digital camera.

The p-channel MOSFETs P3 and P4 and the n-channel MOSFETs N3 and N4 configure an H bridge circuit. The connecting point of the p-channel MOSFET P3 and the n-channel MOSFET N3 is connected to the terminal OUT3. The connecting point of the p-channel MOSFET P4 and the n-channel MOSFET N4 is connected to the terminal OUT4. A motor coil 42 is connected between the terminals OUT3 and OUT4 (2 channel: 2 ch). Also, the p-channel MOSFETs P5 and P6 and the n-channel MOSFETs N5 and N6 configure an H bridge circuit. The connecting point of the p-channel MOSFET P5 and the n-channel MOSFET N5 is connected to the terminal OUT5. The connecting point of the p-channel MOSFET P6 and the n-channel MOSFET N6 is connected to the terminal OUT6. A motor coil 43 is connected between the terminals OUT5 and OUT6 (3 channel: 3 ch). The motor coils 42 and 43 are for example coils of a stepping motor that controls an auto focus mechanism (AF) of a digital camera.

The p-channel MOSFETs P7 and P8 and the n-channel MOSFETs N7 and N8 configure an H bridge circuit. The connecting point of the p-channel MOSFET P7 and the n-channel MOSFET N7 is connected to the terminal OUT7. The connecting point of the p-channel MOSFET P8 and the n-channel MOSFET N8 is connected to the terminal OUT8. A motor coil 44 is connected between the terminals OUT7 and OUT8 (4 channel: 4 ch). The motor coil 44 is for example a coil of a voice coil motor that controls an aperture mechanism of a digital camera.

The p-channel MOSFETs P8 and P9 and the n-channel MOSFETs N8 and N9 configure an H bridge circuit. The connecting point of the p-channel MOSFET P8 and the n-channel MOSFET N8 is connected to the terminal OUT8. The connecting point of the p-channel MOSFET P9 and the n-channel MOSFET N9 is connected to the terminal OUT9. A motor coil 45 is connected between the terminals OUT8 and OUT9 (5 channel: 5 ch). The motor coil 45 is for example a coil of a voice coil motor that controls a shutter mechanism of a digital camera. Here, the p-channel MOSFET P8 and the n-channel MOSFET N8 are shared in the H bridge circuits that control energizing of the motor coils 44 and 45.

The power supply voltage $V_M$ outputted from a power source 46 is applied to the sources of the p-channel MOSFETs P1 to P9 through a terminal VM. The power supply voltage $V_M$ is a voltage generated by boosting battery voltage with a DC/DC converter, for example. Also, the sources of the n-channel MOSFETs N1 to N6 are grounded through a terminal GND. The sources of the n-channel MOSFETs N7 to N9 are connected to a resistor 47 through a terminal RF.

The serial-parallel conversion circuit 20 (data signal receiving circuit) is connected to a CPU 48 thorough terminals for serial communication SCLK, DATA, and STB (data signal input terminals). The circuit 20 receives various serial data signals transmitted from the CPU 48, converts the received serial data signals into the parallel data signals, and transfers the converted data signals to various circuits in the motor driving integrated circuit 10.

The oscillation circuit 21 outputs an oscillating signal that oscillates at a predetermined frequency. The oscillating signal outputted from the oscillation circuit 21 is used for generating a pulse signal that PWM (pulse width modulation)-controls a motor coil.

The pulse generating circuit 22 generates a pulse signal for PWM-controlling the motor coil 41 on the basis of an oscillating signal outputted from the oscillation circuit 21. Here, a duty ratio (for example a ratio at level H) of a pulse signal generated by the pulse generating circuit 22 is set based on a data signal outputted from the serial-parallel conversion circuit 20 to the pulse generating circuit 22.

The forward/reverse control circuit 24 outputs a controlling signal for controlling the rotational direction of a DC motor that has the motor coil 41, based on a data signal outputted from the serial-parallel conversion circuit 20 to the forward/reverse control circuit 24. In the present embodiment, when the motor coil 41 is energized in the direction from the terminal OUT1 to the terminal OUT2, the DC motor rotates in the forward direction. On the other hand, when the motor coil 41 is energized in the direction from the terminal OUT2 to the terminal OUT1, the DC motor rotates in the reverse direction.

The logic circuit 30 outputs a signal for PWM-controlling the motor coil 41 to the gates of the p-channel MOSFETs P1 and P2 and the n-channel MOSFETs N1 and N2, based on a pulse signal outputted from the pulse generating circuit 22 and a controlling signal outputted from the forward/reverse control circuit 24.

For example, when a controlling signal outputted from the forward/reverse control circuit 24 is a signal indicating rotation in the forward direction, the logic circuit 30 energizes the motor coil 41 in the direction from the terminal OUT1 to the terminal OUT2 by outputting signals for turning the p-channel MOSFET P1 and the n-channel MOSFET N2 on, and for turning the p-channel MOSFET P2 and the n-channel MOSFET N1 off. Furthermore, in the case of rotation in the forward direction, the logic circuit 30 intermittently drives (PWM-controls) the p-channel MOSFET P1, for example, based on a pulse signal outputted from the pulse generating circuit 22. Here, the voltage across the motor 41 is $V_M$, only during the p-channel MOSFET P1 is on. That is, the ratio at which the p-channel MOSFET P1 is turned on is controlled, based on a pulse signal outputted from the pulse generating circuit 22, and then the driving voltage of the motor coil 41 changes. Also, the transistors PWM-controlled may be not only the p-channel MOSFETs P1 and P2 on the source side but also the n-channel MOSFETs N1 and N2 on the data sink side.

When the p-channel MOSFET P1 is driven intermittently, even if the p-channel MOSFET P1 is turned off, the motor coil 41 continues to send current. Therefore, the current outputted from the motor 41 flows through the n-channel MOSFET N2 and a parasitic diode of the n-channel MOSFET N1. Here, if current is sent to the parasitic diode of the n-channel MOSFET N1, loss of energy becomes large. Hence the logic circuit 30 may turn the n-channel MOSFET N1 on, when the p-channel MOSFET P1 is turned off. In this case, the current outputted from the motor coil 41 flows through the n-channel MOSFET N2 and the n-channel MOSFET N1, and as a result, loss of energy can be restrained.

The pulse generating circuit 23 generates a pulse signal for PWM-controlling the motor coils 42 and 43 on the basis of an oscillating signal outputted from the oscillation circuit 21. Here, the duty ratio of a pulse signal that the pulse generating circuit 23 generates is set based on a data signal outputted from the serial-parallel conversion circuit 20 to the pulse generating circuit 23.

The excitation control circuit 25 outputs a controlling signal for controlling the rotational direction and the excitation mode of a stepping motor configured by the motor coils 42 and 43, based on a data signal outputted from the serial-parallel conversion circuit 20 to the excitation control circuit 25. Also, in the present embodiment, the motor coils 42 and 43 can be excited in a two-phase excitation mode or a one-two phase excitation mode.

The logic circuit 31 outputs a signal for PWM-controlling the motor coils 42 and 43 in the set excitation mode to the gates of the p-channel MOSFETs P3 to P6, and the n-channel MOSFETs N3 to N6, based on a pulse signal outputted from the pulse generating circuit 23 and a controlling signal outputted from the excitation control circuit 25. Here, PWM control of the motor coils 42 and 43 can be performed in a similar manner to PWM control of the motor coil 41.

The energizing control circuit 26 outputs a controlling signal for controlling the energizing direction of motor coils 44 and 45, based on a data signal outputted from the serial-parallel conversion circuit 20 to the energizing control circuit 26.

The voltage reference circuit 27 is a circuit for outputting a predetermined reference voltage. The reference voltage selection circuit 28 is able to generate reference voltages with several levels on the basis of a reference voltage outputted from the voltage reference circuit 27. The reference voltage selection circuit 28 selects anyone from a plurality of reference voltages and outputs the selected voltage to the non-inverting input terminal of the comparator 29, based on a data signal outputted from the serial-parallel conversion circuit 20 to the reference voltage selection circuit 28.

The comparator 29 is a circuit for controlling in such a way that a current run through the motor coils 44 and 45 becomes a constant current corresponding to a reference voltage that is outputted from the reference voltage selection circuit 28. The sources of the n-channel MOSFETs N7 to N9 are connected to a resistor 47 via the terminal RF and to the inverting input terminal of the comparator 29. Hence, a voltage according to a current run through the motor coils 44 and 45 is applied to the inverting input terminal of the comparator 29. That is, when the current that flows through the motor coils 44 and 45 is lower than a constant current corresponding to a reference voltage outputted from the reference voltage selection circuit 28, the comparator 29 outputs a signal of H level. On the other hand, when the current that flows through the motor coils 44 and 45 is higher than a constant current corresponding to a reference voltage outputted from the reference voltage selection circuit 28, the comparator 29 outputs a signal of L level.

The logic circuit 32 outputs a signal for controlling energization of one of the motor coils 44 and 45 to the gates of the p-channel MOSFETs P7 to P9 and the n-channel MOSFETs N7 to N9, based on a controlling signal outputted from the energizing control circuit 26. Also, the logic circuit 32 controls a signal outputted to the gates of the p-channel MOSFETs P7 to P9 and the n-channel MOSFETs N7 to N9, based on a controlling signal outputted from the comparator 29. As a result, the logic circuit 32 controls in such a way that a current that flows into the motor coils 44 and 45 corresponds to a reference voltage outputted from the reference voltage selection circuit 28.

Figure 2:
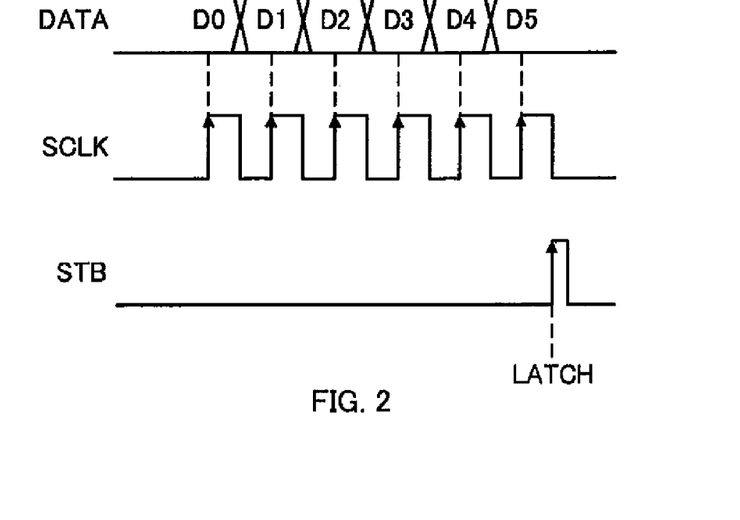
FIG. 2 is a diagram illustrating the timing for inputting a serial data signal from a CPU to a motor driving integrated circuit.

FIG. 2 is a diagram that illustrates the timing for inputting a serial data from the CPU 48 to the motor driving integrated circuit 10. The CPU 48 inputs in sequence, for example, each bit of 6-bit data signal D0 to D5 from the terminal DATA at the timing of each rising of a clock signal inputted from the terminal SCLK. Thereafter, the CPU 48 inputs a pulse signal from the terminal STB. The serial-parallel conversion circuit 20 latches for example the 6-bit data signal D0 to D5 inputted from the terminal DATA at the timing of rising of a signal inputted from the terminal STB. Here, in the present embodiment, making a serial data signal inputted as 6 bit data D0 to D5, and the 3 higher bits D0 to D2 of the serial data indicate address data and the 3 lower bits D3 to D5 of the serial data respectively indicate each data content for controlling.

Figure 3:
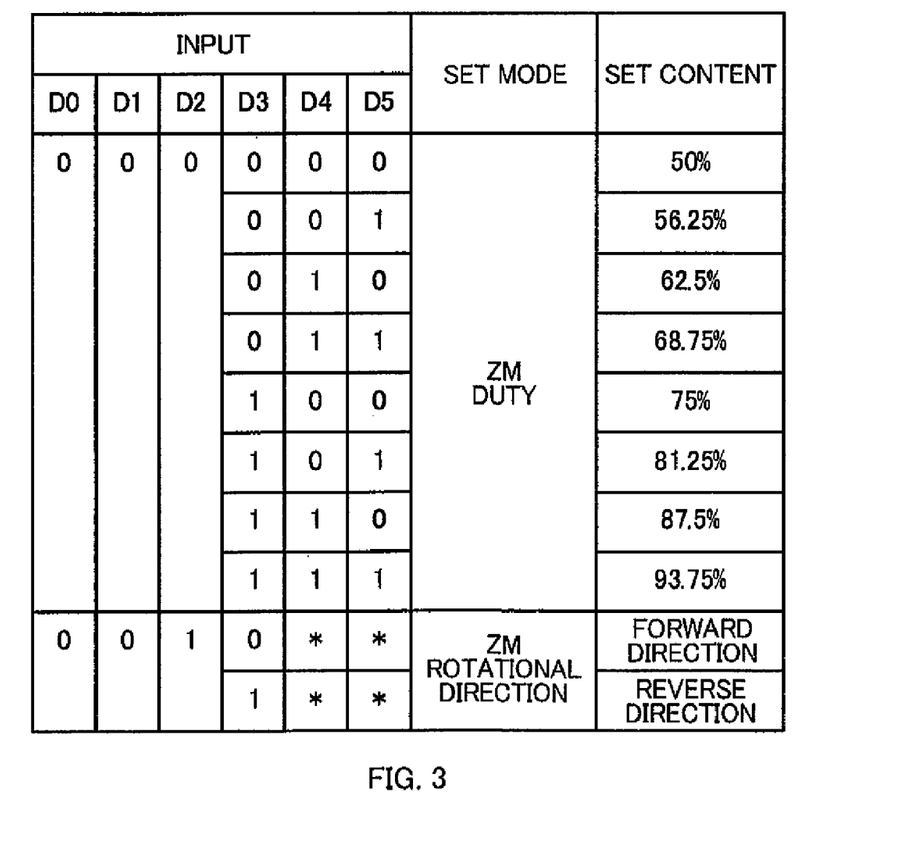
FIG. 3 is a diagram showing an example of a serial data inputted for controlling a DC motor.

FIG. 3 is a diagram showing an example of a serial data inputted for controlling the DC motor comprised of the motor coil 41. When the 3 higher bits D0 to D2 of a serial data are "000", the 3 lower bits D3 to D5 of the serial data are outputted to the pulse generating circuit 22. The pulse generating circuit 22 controls the duty ratio of a pulse signal to be generated, based on the 3 bits D3 to D5 of the serial data outputted from the serial-parallel conversion circuit 20. For, example, when the data D3 to D5 is "000", the duty ratio is 50%. As the data D3 to D5 changes to higher values such as "001," "010," "011," and so on, duty ratio increases in increments of 6.25% to higher values such as 56.25%, 62.5%, 68.75%, and so on. When the data D3 to D5 is "111," the duty ratio is 93.75%.

Furthermore, when the 3 higher bits D0 to D2 of a serial data are "001," the data D3 is outputted to the forward/reverse control circuit 24. The forward/reverse control circuit 24 controls the rotational direction of the DC motor comprised of the motor coil 41, based on the data D3 outputted from the serial-parallel conversion circuit 20. For example, the forward/reverse control circuit 24 outputs a controlling signal that controls the DC motor rotates in the forward direction to the logic circuit 30, when the data D3 is "0," and outputs a controlling signal that controls the DC motor rotates in the reverse direction to the logic circuit 30, when the data D3 is "1". Here, "*" in the FIG. 3 indicates "don't care," and the same is applied in the following figures.

Figure 4:
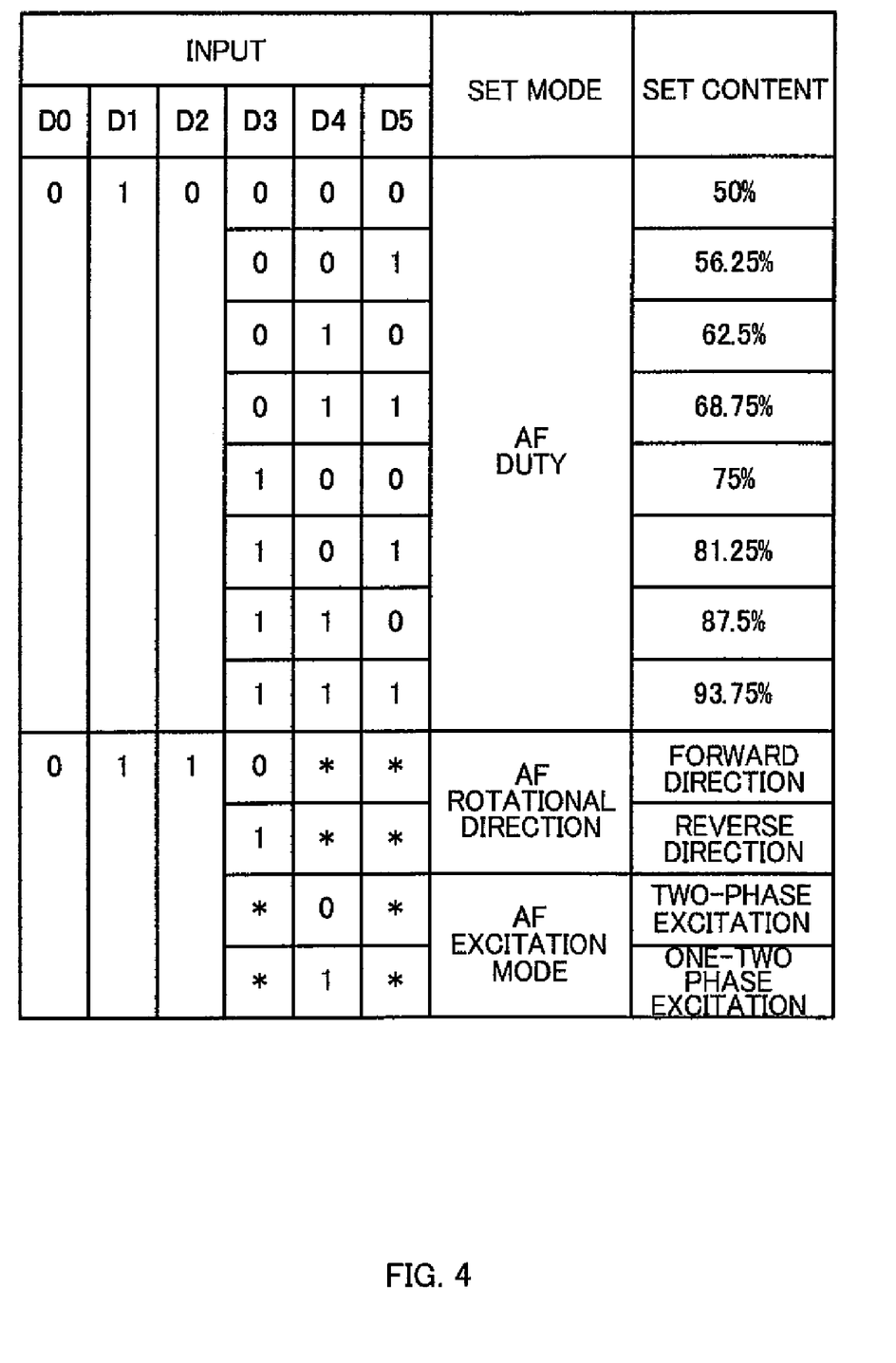
FIG. 4 is a diagram showing an example of a serial data inputted for controlling a stepping motor.

FIG. 4 is a diagram showing an example of a serial data inputted for controlling the stepping motor configured by the motor coils 42 and 43. When the 3 higher bits D0 to D2 of the serial data are "010," the 3 lower bits D3 to D5 of the serial data are outputted to the pulse generating circuit 23. The pulse generating circuit 23 controls the duty ratio of a pulse to be generated in a manner similar to the pulse generating circuit 22, based on the 3 bit data D3 to D5 outputted from the serial-to-parallel conversion circuit 20.

Furthermore, when the 3 higher bits D0 to D2 of a serial data are "011," the data D3 and D4 are outputted to the excitation control circuit 25. The excitation control circuit 25 controls the rotational direction and the excitation mode of the stepping motor configured by the motor coils 42 and 43, based on the data D3 and D4 outputted from the serial-parallel conversion circuit 20. For example, the excitation control circuit 25 outputs a controlling signal to the logic circuit 31 in such a way that the stepping motor rotates in the forward direction, when the data D3 is "0". On the other hand, the excitation control circuit 25 outputs a controlling signal to the logic circuit 31 in such a way that the stepping motor rotates in the reverse direction, when the data D3 is "1". Also, for example, the excitation control circuit 25 outputs a controlling signal to the logic circuit 31 in such a way that the excitation mode of the stepping motor is turned into a two-phase excitation mode, when the data D4 is "0". On the other hand, the excitation control circuit 25 outputs a controlling signal to the logic circuit 31 in such a way that the excitation mode of the stepping motor is turned into a one-two phase excitation mode, when the data D4 is "1".

Figure 5:
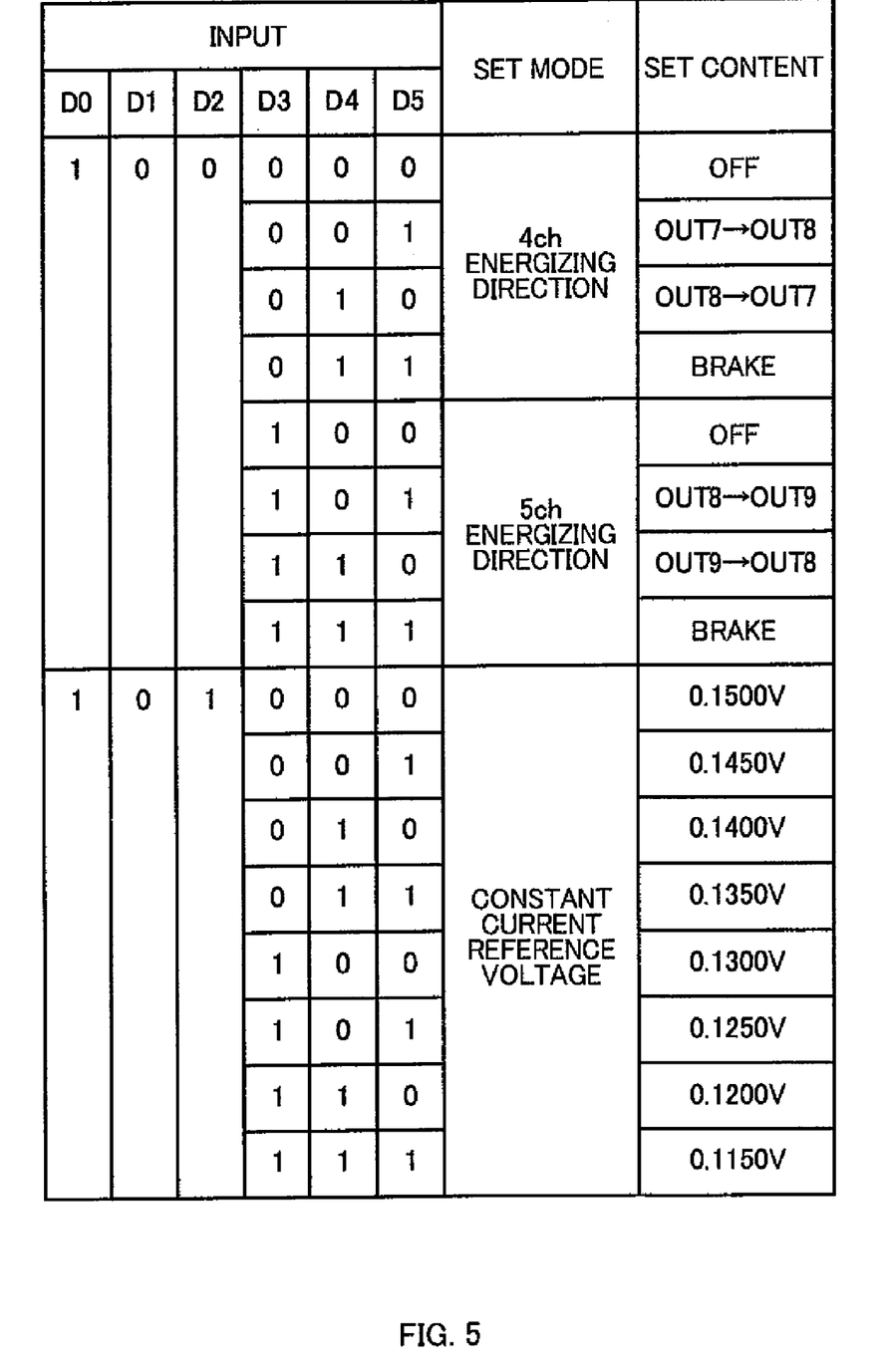
FIG. 5 is a diagram showing an example of a serial data inputted for controlling a voice coil motor.

FIG. 5 is a diagram showing an example of a serial data inputted for controlling the voice coil motor configured by the motor coils 44 and 45. When the 3 higher bits D0 to D2 of the serial data are "100", the 3 lower bits D3 to D5 of the serial data are outputted to the energizing control circuit 26. The energizing control circuit 26 controls the energizing direction of motor coils 44 and 45, based on the 3 lower bit data D3 to D5 outputted from the serial-parallel conversion circuit 20. For example, the energizing control circuit 26 outputs a controlling signal for controlling energization of the motor coil 44 (4 ch), when the data D3 is "0". On the other hand, the energizing control circuit 26 outputs a controlling signal for controlling energization of the motor coil 45 (5 ch), when the data D3 is "1". The energizing control circuit 26 outputs a controlling signal for turning the voice coil motor off to the logic circuit 32, when the data D4 and D5 is "00". Also, the energizing control circuit 26 outputs, to the logic circuit 32, a controlling signal for turning the energizing direction in the direction from the terminal OUT7 to the terminal OUT8 or from the terminal OUT8 to the terminal OUT9, when the data D4 and D5 is "01". Furthermore, the energizing control circuit 26 outputs, to the logic circuit 32, a controlling signal for turning the energizing direction in the direction from the terminal OUT8 to the terminal OUT7 or from the terminal OUT9 to the terminal OUT8, when the data D4 and D5 is "10". Also, the energizing control circuit 26 outputs a controlling signal for braking the voice coil motor to the logic circuit 32, when the data D4 and D5 is "11".

For example, when energization of the motor coil 44 is controlled, all of the p-channel MOSFETs P7 and P8 and the n-channel MOSFETs N7 and N8 are turned off, and then the voice coil motor having the motor coil 44 is turned off. Also, when the p-channel MOSFET P7 and the n-channel MOSFET N8 are turned on, and the p-channel MOSFET P8 and the n-channel MOSFET N7 are turned off, the energizing direction changes in the direction from the terminal OUT7 to the terminal OUT8. Furthermore, when the p-channel MOSFET P8 and the n-channel MOSFET N7 are turned on, and the p-channel MOSFET P7 and the n-channel MOSFET N8 are turned off, the energizing direction changes in the direction from the terminal OUT8 to the terminal OUT7. Also, when the p-channel MOSFETs P7 and P8 are turned on and the n-channel MOSFETs N7 and N8 are turned off, and then the voice coil motor having the motor coil 44 is braked.

Furthermore, when the 3 higher bits D0 to D2 of a serial data are "101", the 3 lower bits D3 to D5 of the serial data are outputted to the reference voltage selection circuit 28. The reference voltage selection circuit 28 selects a reference voltage corresponding to the 3 bit data D3 to D5 outputted from the serial-parallel conversion circuit 20, and applies the selected voltage to the non-inverting input terminal of the comparator 29. For, example, when the 3 bit data D3 to D5 is "000," the reference voltage is 0.15 V. In this case, as the 3 bit data D3 to D5 increases to higher values such as "001," "010," "011," and so on, the reference voltage changes in steps of 0.005 V to lower values such as 0.145 V, 0.14 V, 0.135 V, and so on. When the 3 bit data D3 to D5 is "111," the reference voltage is 0.115 V. The reference voltage selection circuit 28 that selects a plurality of reference voltages according to the 3 bit data D3 to D5, and outputs the selected voltage in this manner may be, for example, configured by using a plurality of voltage dividers and switching circuits.

Figure 6:
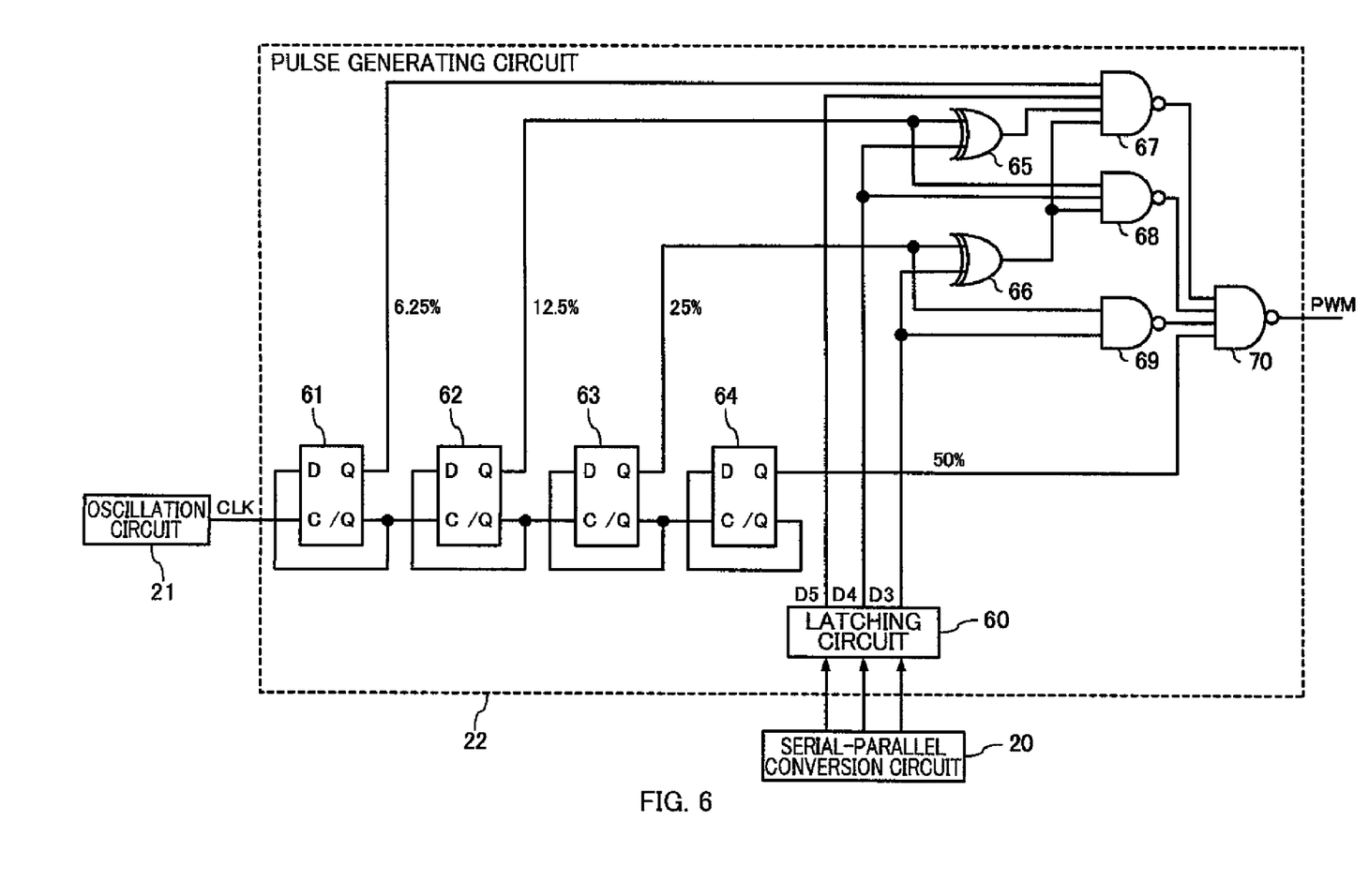
FIG. 6 is a diagram showing a structural example of a pulse generating circuit.

FIG. 6 is a diagram showing a structural example of the pulse generating circuit 22. The pulse generating circuit 22 has a latching circuit 60, D-type flip-flops (D-FFs) 61 to 64, EXOR circuits 65 and 66, and NAND circuits 67 to 70.

The latching circuit 60 is a circuit that holds and outputs the data signal D3 to D5 that is outputted from the serial-parallel conversion circuit 20. Here, the latching circuit 60 can be configured by using three D-FFs, for example.

The D-FFs 61 to 64 frequency-divide an oscillating signal CLK with a predetermined frequency that is outputted from the oscillation circuit 21, and are circuits (a rectangular signal generating circuit) for generating a plurality of rectangular signals differ in the pulse widths. In the oscillating signal CLK, the time of H level is the same as that of L level. According to the D-FF 61, the oscillating signal CLK outputted from the oscillation circuit 21 is inputted to a clock terminal C. Also, a signal outputted from an inverted output terminal /Q becomes inputted to a data signal input terminal D. Furthermore, a signal outputted from an output terminal Q is a rectangular signal obtained by dividing the frequency of the oscillating signal CLK into one-half the frequency of the oscillating signal CLK. According to the D-FF 62, a signal outputted from the inverted output terminal /Q of the D-FF 61 is inputted to a clock terminal C of the D-FF 62. Also, a signal outputted from an inverted output terminal /Q of the D-FF 62 is inputted to a data signal input terminal D of the D-FF 62. Furthermore, a signal outputted from an output terminal Q of the D-FF 62 becomes a rectangular signal obtained by dividing the frequency of the oscillating signal CLK into one-fourth the frequency of the oscillating signal CLK. According to the D-FF 63, a signal outputted from the inverted output terminal /Q of the D-FF 62 is inputted to a clock terminal C of the D-FF 63. Also, a signal outputted from an inverted output terminal /Q of the D-FF 63 is inputted to a data signal input terminal D of the D-FF 63. Furthermore, a signal outputted from an output terminal Q of the D-FF 63 becomes a rectangular signal obtained by dividing the frequency of the oscillating signal CLK into one-eighth the frequency of the oscillating signal CLK. According to the D-FF 64, a signal outputted from the inverted output terminal /Q of the D-FF 63 is inputted to a clock terminal C of the D-FF 64. Also, a signal outputted from an inverted output terminal /Q of the D-FF 64 is inputted to a data signal input terminal D of the D-FF 64. Furthermore, a signal outputted from an output terminal Q of the D-FF 64 becomes a rectangular signal obtained by dividing the frequency of the oscillating signal CLK into one-sixteenth the frequency of the oscillating signal CLK.

The EXOR circuits 65 and 66, and the NAND circuits 67 to 70 configure a logic circuits (synthesizing circuit) that synthesizes rectangular signals outputted from the D-FFs 61 to 64 of different frequencies and that outputs the synthesized signal as a pulse signal PWM, based on the data signal D3 to D5 outputted from the latching circuit 60. A signal outputted from the output terminal Q of the D-FF 62 and the data signal D4 outputted from the latching circuit 60 are inputted to the EXOR circuit 65. A signal outputted from the output terminal Q of the D-FF 63 and the data signal D3 outputted from the latching circuit 60 are inputted to the EXOR circuit 66. A signal outputted from the output terminal Q of the D-FF 61, the data signal D5 outputted from the latching circuit 60, and signals outputted from the EXOR circuits 65 and 66 are inputted to the NAND circuit 67. A signal outputted from the output terminal Q of the D-FF 62, the data signal D4 outputted from the latching circuit 60, and a signal outputted from the EXOR circuit 66 are inputted to the NAND circuit 68. A signal outputted from the output terminal Q of the D-FF 63, and the data signal D3 outputted from the latching circuit 60 are inputted to the NAND circuit 69. Signals outputted from the NAND circuits 67 to 69, and a signal outputted from the output terminal Q of the D-FF 64 are inputted to the NAND circuit 70. As a result, a signal outputted from the NAND circuit 70 becomes the pulse signal PWM.

Figure 7:
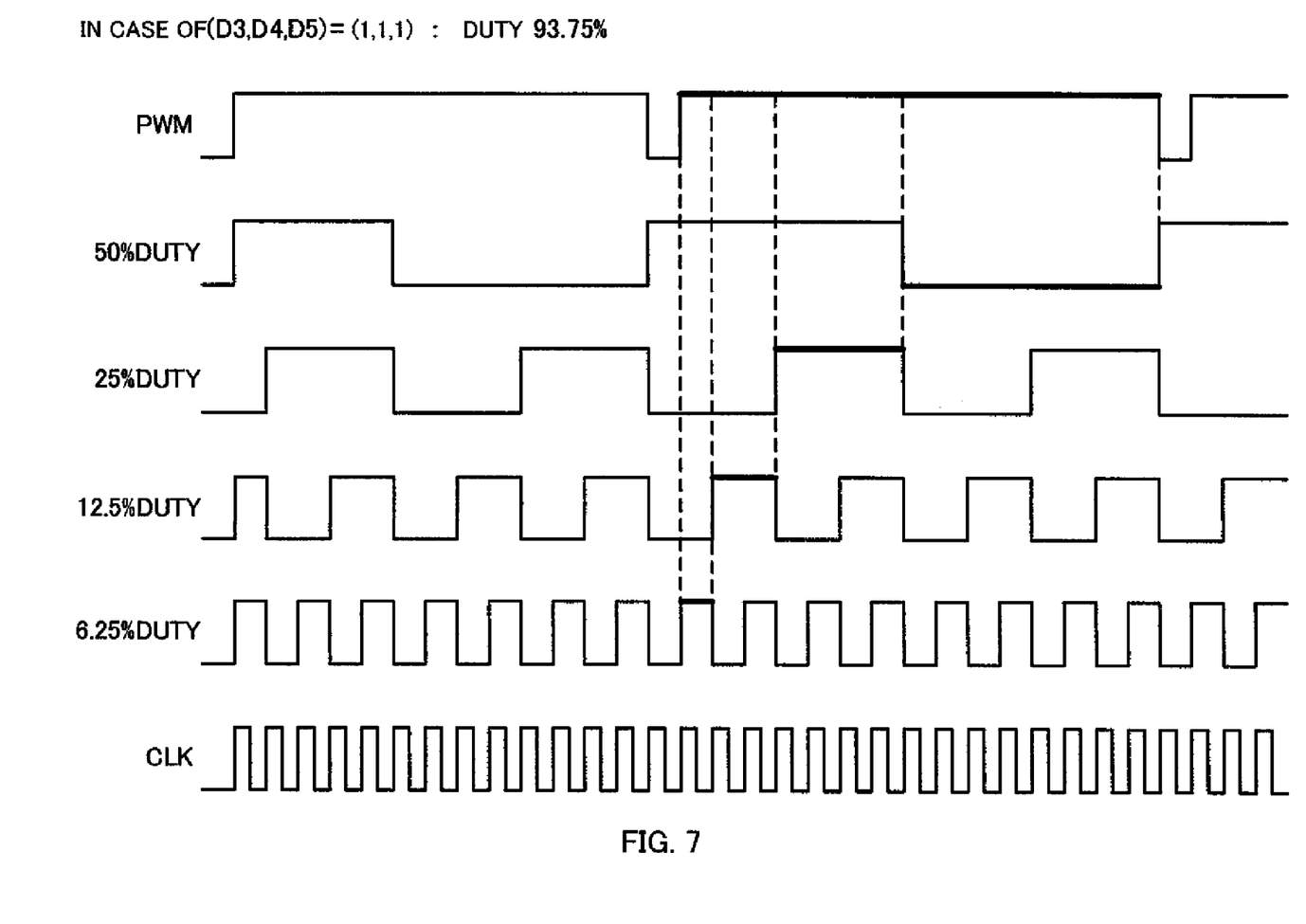
FIG. 7 is a diagram showing an example of a pulse signal generated by the pulse generating circuit as illustrated in FIG. 6.

FIG. 7 is a diagram showing an example of a pulse signal generated by the pulse generating circuit 22 as illustrated in FIG. 6. The signal represented by PWM in FIG. 7 is a pulse signal PWM outputted from the NAND circuit 70. Also, the signal represented by 50% Duty is a signal outputted from the output terminal Q of the D-FF 64. The signal represented by 25% Duty is a signal outputted from the output terminal Q of the D-FF 63. The signal represented by 12.5% Duty is a signal outputted from the output terminal Q of the D-FF 62. The signal represented by 6.25% Duty is a signal outputted from the output terminal Q of the D-FF 61.

Here, for example, when (D3, D4, D5)=(0, 0, 0), all of the output signals of the NAND circuits 67 to 69 are at H level. At this time, the pulse signal PWM is equal to a signal obtained by inverting the signal (represented by 50% Duty) outputted from the output terminal Q of the D-FF 64. Then, the pulse signal PWM has a duty ratio of 50%. That is, the pulse signal PWM is at H level when the signal (represented by 50% Duty) outputted from the output terminal Q of the D-FF 64 is at L level. Furthermore, for example, when (D3, D4, D5)=(0, 0, 1), the pulse signal PWM is at H level in the time obtained by adding the time when the signal (represented by 50% Duty) outputted from the output terminal Q of the D-FF 64 is at L level and the time when the signal level in one period of the signal (represented by 6.25% Duty) outputted from the output terminal Q of the D-FF 61 is H level. At this time, the pulse signal PWM has a duty ratio of 56.25% (−50%+6.25%). In a similar manner, when D4 is "1," the time when the signal level in one period of the signal (represented by 12.5% Duty) outputted from the output terminal Q of the D-FF 62 is H level, is added to the time when the pulse signal PWM is at H level. As a result, the duty ratio of the pulse signal PWM increases by 12.5%. Also, when D3 is "1," the time when the signal level in one period of the signal (represented by 25% Duty) outputted from the output terminal Q of the D-FF 63 is H level, is added to the time when the pulse signal PWM is at H level. As a result, the duty ratio of the pulse signal PWM increases by 25%. When (D3, D4, D5)=(1, 1, 1), the pulse signal PWM is at H level in the time obtained by adding the time when the signal (represented by 50% Duty) outputted from the output terminal Q of the D-FF 64 is at L level and the time when each signal level in one period of each signal outputted from the output terminals Q of the D-FFs 61 to 63 is H level. At this time, the pulse signal PWM has a duty ratio of 93.75 (=50%+25%+12.5%+6.25%), as shown in FIG. 7.

In this manner, the pulse generating circuit 22 synthesizes rectangular signals of different pulse widths outputted from the D-FFs 61 to 64. Consequently, it is possible to adjust the duty ratio of the pulse signal PWM in increments of 6.25% in the range of 50% to 93.75%. In the present embodiment, although the value of 6.25% is used as a width of increment of the duty ratio, it is possible to alter a width of increment of the duty ratio of the pulse signal PWM by changing the number of D-FFs for frequency-dividing an oscillating signal CLK.

The pulse generating circuit 23 also can be configured in a manner similar to the pulse generating circuit 22. Here, The D-FFs 61 to 64 maybe shared between the pulse generating circuits 22 and 23 in order to use these D-FFs as a frequency divider circuit for generating a plurality of rectangular signals of different pulse widths. In this manner, if the D-FFs 61 to 64 may be shared between the pulse generating circuits 22 and 23, it is possible to restrain increase of circuit scale of the motor driving integrated circuit 10.

Also, although the duty ratio of the pulse signal PWM has a range of 50% to 93.75% in the pulse generating circuit 22 as illustrated in FIG. 6, there may be used a structure able to set the duty ratio of the pulse signal PWM up to 100%.

Figure 8:
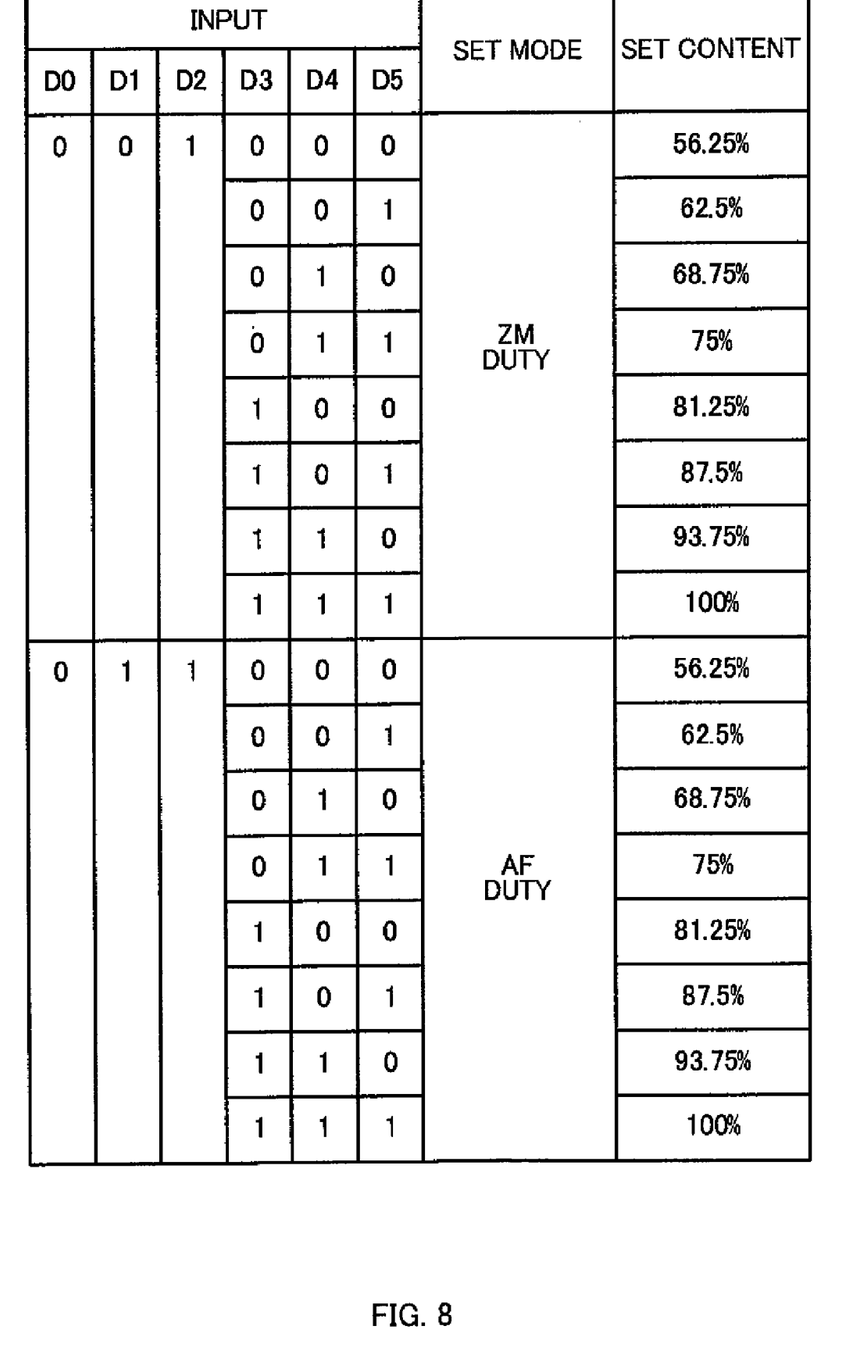
FIG. 8 is a diagram showing an example of a serial data inputted for controlling duty ratio, in the case where duty ratio can be set up to 100%.

FIG. 8 is a diagram showing an example of a serial data inputted to control a duty ratio, in the case where a duty ratio can be set up to 100%. When the 3 higher bits D0 to D2 of the serial data are "001," the 3 lower bits D3 to D5 of the serial data are outputted to the pulse generating circuit 22. Then, a duty ratio of the pulse signal for controlling the motor coil 41 is set in increments of 6.25% in the range of 56.25% to 100%, according to the 3 lower bits D3 to D5 of the serial data. Also, when the 3 higher bits D0 to D2 of the serial data are "011,"

the 3 lower bits D3 to D5 of the serial data are outputted to the pulse generating circuit 23. Then, a duty ratio of the pulse signal for controlling the motor coils 42 and 43 is set in increments of 6.25% in the range of 56.25% to 100%, according to the 3 lower bits D3 to D5 of the serial data.

Figure 9:
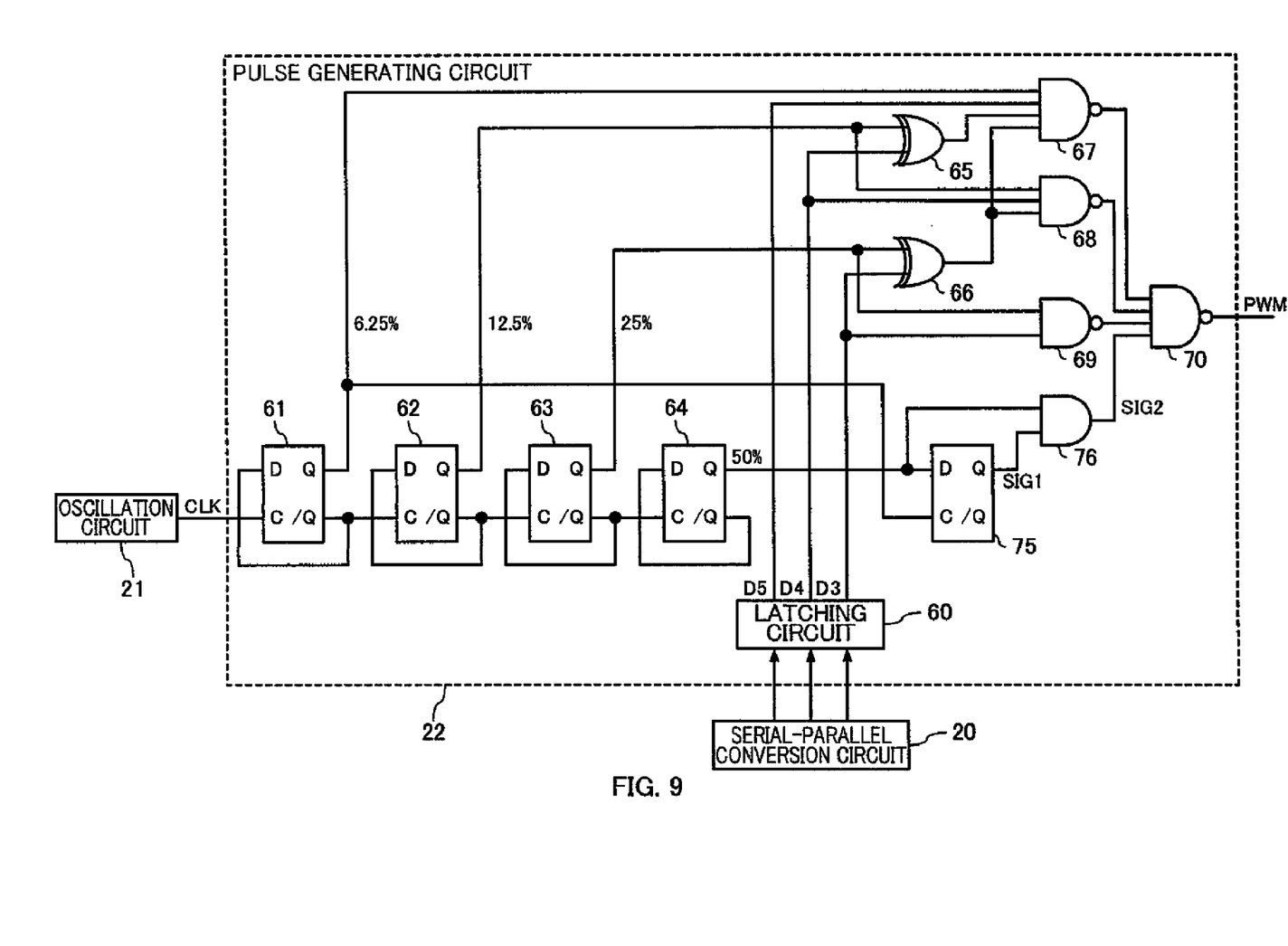
FIG. 9 is a diagram showing a structural example of a pulse generating circuit that can set duty ratio up to 100%.

FIG. 9 is a diagram showing a structural example of the pulse generating circuit 22 that can set a duty ratio up to 100%. The pulse generating circuit 22 has a D-FF 75 and an AND circuit 76 which constitute an adjustment circuit, in addition to the structure as shown in FIG. 6. According to the D-FF 75, a signal outputted from the output terminal Q of the D-FF 61 is inputted to a clock terminal C. Also, a signal outputted from the output terminal Q of the D-FF 64 is inputted to a data signal input terminal D. A signal outputted from the output terminal Q of the D-FF 64 and a signal SIG1 outputted from the output terminal Q of the D-FF 75 are inputted to the AND circuit 76. A signal SIG2 outputted from the AND circuit 76 is inputted to the NAND circuit 70 as a substitute for a signal outputted from the output terminal Q of the D-FF 64 in the structure as shown in FIG. 6. The other structure is similar to the structure as shown in FIG. 6.

Figure 10:
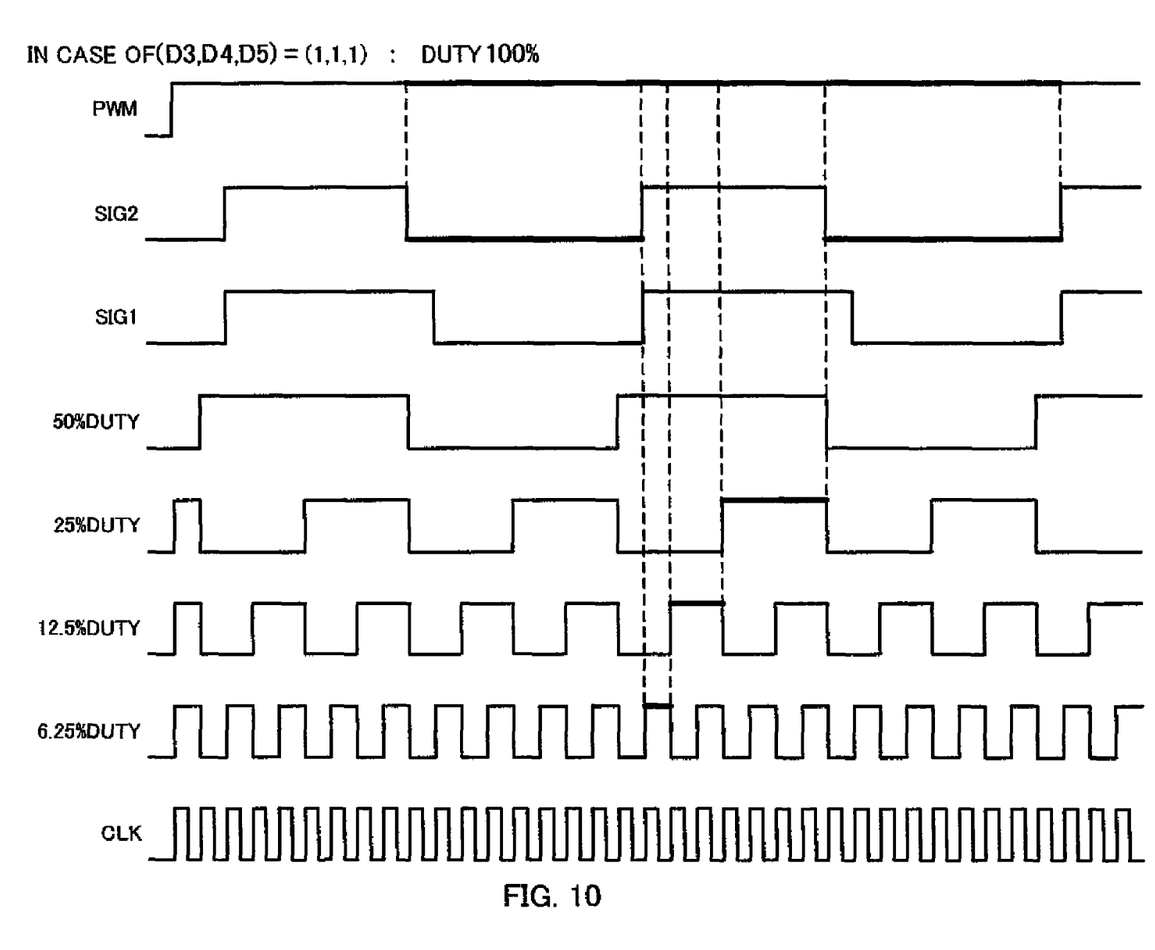
FIG. 10 is a diagram showing an example of a pulse signal generated by the pulse generating circuit as illustrated in FIG. 9.

FIG. 10 is a diagram showing an example of a pulse signal generated by the pulse generating circuit 22 as illustrated in FIG. 9. The signal SIG1 outputted from the output terminal Q of the D-FF75 is a signal in which the phase of a signal (represented by 50% Duty) outputted from the output terminal Q of the D-FF 64 is delayed by a half period of the signal (represented by 6.25% Duty) outputted from the output terminal Q of the D-FF 61. The signal SIG2 outputted from the AND circuit 76 is a signal obtained by a logical product of a signal (represented by 50% Duty) outputted from the output terminal Q of the D-FF 64 and a signal SIG1 outputted from the output terminal Q of the D-FF 75. That is, the signal SIG2 outputted from the AND circuit 76 is at L level in the time obtained by adding the time when the widest pulse width signal (represented by 50% Duty) of the signals outputted from the output terminals Q of the D-FFs 61 to 64 is at L level, and the time when the narrowest pulse width signal (represented by 6.25% Duty) of the signals outputted from the output terminals Q of the D-FFs 61 to 64 is at L level. Also, the signal SIG2 is a rectangle single.

Here, for example, when (D3, D4, D5)=(0, 0, 0), the pulse signal PWM is obtained by inverting the signal SIG2 outputted from the NAND circuit 76. Then, the pulse signal PWM has a duty ratio of 56.25%. In a manner similar to the structure as shown in FIG. 6, the duty ratio of the pulse signal PWM is set in increments of 6.25% by synthesizing the signal SIG2 and the signals outputted from the output terminal Q of the D-FFs 61 to 63. For example, as shown in FIG. 10, when (D3, D4, D5)=(1, 1, 1), the pulse signal PWM is at H level in the time obtained by adding the time when the signal SIG2 is at L level and the time when each signal level in one period of each signal (represented by 6.25%, 12.5%, and 25% Duty) outputted from the output terminals Q of the D-FFs 61 to 63 is H level. At this time, the pulse signal PWM has a duty ratio of 100%. The pulse generating circuit 23 also can set the duty ratio up to 100% by being configured similar to the pulse generating circuit 22.

The foregoing has described the embodiments of the present invention. As described above, a serial data signal for controlling control circuits such as the excitation control circuit 25, the energizing control circuit 26, the reference voltage selection circuit 28, and the like, is inputted from one data signal input terminal DATA in the motor driving integrated circuit 10. These control circuits perform various controls, based on a data signal (a first data signal) that the serial-parallel conversion circuit 20 receives through the data signal input terminal DATA. Also, a duty ratio of a pulse signal to be generated is adjusted, based on a data signal (a second data signal) that the serial-parallel conversion circuit 20 receives through the data signal input terminal DATA in a similar manner to other control circuits even in the pulse generating circuit 22 that generates a pulse signal for PWM control. That is, for example, not necessary to generate a pulse signal with a predetermined duty ratio in the CPU 48 and the like to input the pulse signal into the motor driving integrated circuit 10. Therefore, it is not necessary to provide an additional terminal for inputting a pulse signal for PWM control, and as a result, it is possible to restrain increase of the number of terminals in the motor driving integrated circuit 10. Furthermore, in the motor driving integrated circuit 10, because PWM control is adopted as a method for controlling driving voltage of the motor coil 41 instead of constant voltage control, increase of power consumption can be restrained.

Also, the motor driving integrated circuit 10 has the pulse generating circuit 23 that generates a pulse signal for PWM-controlling the motor coils 42 and 43 in addition to the pulse generating circuit 22. Duty ratio of a pulse signal to be generated is adjusted based on a data signal (a first data signal) that the serial-parallel conversion circuit 20 receives through the data signal input terminal DATA in a manner similar to the pulse generating circuit 22 even in the pulse generating circuit 23. Thus, it is possible to generate a plurality of pulse signals of different duty ratios in the motor driving integrated circuit 10. That is, although the number of motors PWM-controlled increases, it is not necessary to provide an additional terminal for inputting a pulse signal for PWM control, and as a result, it is possible to restrain increase of the number of terminals. Also, although two circuits has been used for generating a pulse signal for PWM control in the present embodiments, it is possible to restrain increase of the number of terminals, similarly, even in the case of using three circuits or more.

Alternatively, in the pulse generating circuit 22, a plurality of rectangular signals of different pulse widths are generated by using the frequency divider circuit configured by D-FFs 61 to 64. Then, the plurality of rectangular signals are synthesized in a logic circuit based on a data inputted from the CPU 48, and therefore, a pulse signal with a predetermined duty ratio is generated. In this manner, if rectangular signals frequency-divided by the frequency divider circuit are synthesized in the logic circuit, it is possible to generate accurately a rectangular signal or the like that has a narrower pulse width, as compared with the case of generating a pulse signal in comparison of a triangular voltage and a predetermined voltage using a comparator.

Furthermore, in the pulse generating circuit 22 as illustrated in FIG. 9, the D-FF 75 and the AND circuit 76 are added as an adjustment circuit for generating the rectangular signal SIG2 which is at L level in the time obtained by adding the time when the widest pulse width signal (represented by 50% Duty) of the signals outputted from the output terminals Q of the D-FFs 61 to 64 is at L level, and the time when the narrowest pulse width signal (represented by 6.25% Duty) of the signals outputted from the output terminals Q of the D-FFs 61 to 64 is at L level. By using this rectangular signal SIG2 as illustrated in FIG. 10, it is possible to set the pulse signal PWM at H level even at the time when the rectangular signal (represented by 6.25% Duty) having the narrowest pulse width is at L level, and therefore, a pulse signal with a duty ratio of 100% can be generated. Also, even if the time when the rectangular signal SIG2 is at L level is further increased, similarly, it is possible to generate a pulse signal with a duty ratio of 100%.

The above embodiments of the present invention are simply for facilitating the understanding of the present invention and are not in anyway to be construed as limiting the present invention. The present invention may variously be changed or altered without departing from its spirit and encompass equivalents thereof.

What is claimed is:

1. A motor driving integrated circuit for controlling motor driving, comprising:
   a data signal input terminal;
   a data signal receiving circuit configured to receive a data signal inputted from the data signal input terminal;
   a control circuit configured to control the motor driving integrated circuit based on a first data received through the data signal receiving circuit; and
   a pulse generating circuit configured to generate a pulse signal for PWM (Pulse Width Modulation)—controlling a motor coil based on a second data signal received through the data signal receiving circuit, the pulse generating circuit including:
   a rectangular signal generating circuit configured to generate a plurality of rectangular signals different in pulse width; and
   a synthesizing circuit configured to synthesize the plurality of rectangular signals outputted from the rectangular signal generating circuit to generate the pulse signal with a duty ratio corresponding to the second data signal.

2. The motor driving integrated circuit according to claim 1, wherein
   the control circuit synthesizes the plurality of rectangular signals outputted from the rectangular signal generating circuit, and generates a pulse signal with a duty ratio corresponding to the first data signal, for PWM-controlling another motor.

3. The motor driving integrated circuit according to claim 2, wherein
   the rectangular signal generating circuit is a frequency divider circuit configured to frequency-divide an oscillating signal with a predetermined frequency to generate the plurality of rectangular signals, and
   the synthesizing circuit is a logic circuit configured to logically synthesize the plurality of rectangular signals outputted from the frequency divider circuit and the second data signal to generate the pulse signal.

4. The motor driving integrated circuit according to claim 3, wherein
   the rectangular signal generating circuit includes:
   the frequency divider circuit; and
   an adjustment circuit configured to generate a rectangular signal having one logical value in a time obtained by adding a time when the rectangular signal with the widest pulse width outputted from the frequency divider circuit has one logical value, and a time equal to or more than a time when the rectangular signal with the narrowest pulse width outputted from the frequency divider circuit has one logical value, and
   the logic circuit is further configured to synthesize logically the plurality of rectangular signals outputted from the frequency divider circuit, the rectangular signal outputted from the adjustment circuit, and the second data signal, to generate the pulse signal.

5. The motor driving integrated circuit according to claim 1, wherein
   the rectangular signal generating circuit is a frequency divider circuit configured to frequency-divide an oscillating signal with a predetermined frequency to generate the plurality of rectangular signals, and
   the synthesizing circuit is a logic circuit configured to logically synthesize the plurality of rectangular signals outputted from the frequency divider circuit and the second data signal to generate the pulse signal.

6. The motor driving integrated circuit according to claim 5, wherein
   the rectangular signal generating circuit includes:
   the frequency divider circuit; and
   an adjustment circuit configured to generate a rectangular signal having one logical value in a time obtained by adding a time when the rectangular signal with the widest pulse width outputted from the frequency divider circuit has one logical value, and a time equal to or more than a time when the rectangular signal with the narrowest pulse width outputted from the frequency divider circuit has one logical value, and
   the logic circuit is further configured to synthesize logically the plurality of rectangular signals outputted from the frequency divider circuit, the rectangular signal outputted from the adjustment circuit, and the second data signal, to generate the pulse signal.

* * * * *